United States Patent
Liu et al.

(10) Patent No.: US 7,242,483 B2
(45) Date of Patent: Jul. 10, 2007

(54) SMART SPACECRAFT STRUCTURES BASED ON LASER METROLOGY

(75) Inventors: Ketao Liu, Cerritos, CA (US); Cameron Massey, Hawthorne, CA (US); William Barvosa-Carter, Ventura, CA (US); Michael Nolan, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 485 days.

(21) Appl. No.: 10/917,924

(22) Filed: Aug. 12, 2004

(65) Prior Publication Data

US 2006/0044549 A1    Mar. 2, 2006

(51) Int. Cl.
 *G01B 11/24* (2006.01)
(52) U.S. Cl. .................. 356/601; 356/614; 356/237.1
(58) Field of Classification Search .. 356/237.1–237.5, 356/601–623
See application file for complete search history.

(56) References Cited

U.S. PATENT DOCUMENTS

| | | | | |
|---|---|---|---|---|
| 4,591,996 | A | * | 5/1986 | Vachon ........................ 702/42 |
| 5,517,861 | A | * | 5/1996 | Haas et al. ................... 73/799 |
| 6,081,614 | A | * | 6/2000 | Yamada et al. ............. 382/151 |
| 2005/0082262 | A1 | * | 4/2005 | Rueb et al. .............. 219/121.6 |

* cited by examiner

*Primary Examiner*—Hoa Q. Pham
(74) *Attorney, Agent, or Firm*—Johnathan W. Hallman; MacPherson Kwok Chen & Heid LLP

(57) ABSTRACT

A laser metrology system for estimating the deformation of a structure is provided. The system includes a plurality of laser beam position detectors distributed across a surface of the structure. Each laser beam position detector is intersected by a laser beam and is configured to determine the change in location of the intersection point in at least one dimension. By determining the change in location of the intersection point for each laser beam position detector, the laser metrology system can calculate the deformation of the structure that caused these changes in location.

20 Claims, 4 Drawing Sheets

SMART SPACECRAFT STRUCTURES BASED ON LASER METROLOGY

TECHNICAL FIELD

This invention relates generally to laser metrology, and more particularly to a laser metrology system for structures.

BACKGROUND

Accurate measurement of surface shape is important for a number of structural applications. For example, spacecraft with optical payloads may need to know the orientation of optical payload supporting structure to a very high degree of accuracy. By measuring any bending deformation or other changes in this supporting structure, the orientation of the optical payload may be determined. In turn, the optical payload may be adjusted responsive to the measurement of the supporting structure to maintain precision pointing of its optical line-of-sight (LOS). Alternatively, a spacecraft with a large phased-array payload may need to determine the surface deformation of the array-supporting structure with very high precision so that the phasing of the phased-array antenna may be adjusted accordingly to maintain a desired beam direction. Similarly, many communication satellites also have a need to precisely measure their antenna-supporting surfaces to meet their antenna-pointing budgets and thereby provide adequate communication service. Accurate structural measurement is important in all "smart structure" systems that utilize deformation information to enhance functionality.

A conventional approach to determine surface deformation in structures has been to distribute strain gauges across the structure to measure structural strains. However, both the structural strains and the strain sensor response typically varies with temperature. Thus, it is difficult to achieve high-precision measurement of surface deformation using a network of distributed strain sensors across a range of operating temperatures. Given the same surface deformation but a range of temperatures, a strain-sensor approach to surface deformation measurement may generate different measurements.

To provide greater measurement precision, laser metrology systems have been used in a number of industrial applications. These systems generally align the lasesr beam axis with the direction of the deflection to be measured. For surfaces, the laser source is displaced away from the surface such that the laser beam propagation is generally normally-directed or close-to-normally-directed with respect to the surface. For example, if the surface is considered to lie in the x-y plane, the laser beam propagation would be in the approximately in the z direction. Sensors on the surface would then measure the distance from the laser source with respect to the propagation direction. Aside from noise considerations due to decreasing signal strength, it may be shown that for larger surfaces illuminated by a single source, the precision and uniformity of such a measurement system increases as the laser source is further displaced from the surface being characterized and surface orthogonality to all points on the surface is approached.

Although the traditional method of laser metrology with respect to characterizing surface deformation may be used in a number of industrial applications, it is relatively impractical to implement this method in a space-based application. For example, a space structure having a dimension of 15 meters would require the laser source to be deployed a comparable distance away from the antenna array surface. Given the constraints faced during launch, the laser source would likely be supported by a deployable structure rather by a stable reference point on the spacecraft. Vibration and thermal deformation of the resulting deployed laser source structure would thus make accurate characterization of the surface deformation much more difficult and complex. Moreover, spacecraft surfaces oriented close to the ecliptic plane (typical for earth-facing surfaces on geostationary spacecraft) can be subject to direct sunlight exposure. Normally-oriented optical sensors can be saturated for long periods or damaged. This problem is particularly acute for any sensor with a wide field-of-view. Although narrowband filters may be used at the sensors to filter out the sunlight, the residual solar energy may still degrade the performance of the traditional laser metrology system.

Accordingly, there is a need in the art for improved laser metrology systems to measure the deformation of structures.

SUMMARY

In accordance with one aspect of the invention, a laser metrology system for measuring deformation of a structure is provided. The system includes: a plurality of laser sources, each laser source configured to transmit a laser beam across a surface of the structure; and a plurality of laser beam position detectors distributed on the surface, each laser beam position detector being oriented such that it intercepts at least one of the laser beams, each laser beam position detector being configured to determine the location of the interception in at least one dimension.

In accordance with another aspect of the invention, a method of measuring a structure's surface deformation is provided, wherein the structure includes a plurality of laser beam position detectors distributed across its surface and a plurality of laser sources configured to transmit laser beams to the plurality of laser beam position detectors such that each laser beam position detector intercepts a laser beam. The method includes the acts of: determining a default location of the laser beam interception point on each laser beam position detector for a non-deformed orientation of the structure; after a deformation of the structure, determining the change in position of the laser beam interception point for each laser beam position detector with respect to the default location; and processing the change in position for each laser beam interception point to determine the amount of deformation of the structure.

In accordance with another aspect of the invention, a laser metrology system for determining the deformation of a structure is provided. The system includes: a laser source configured to transmit a laser beam across a surface of the structure; a laser beam steering device configured to steer the laser beam from the laser source; a plurality of laser beam position detectors distributed on the surface, each laser beam position detector being oriented such that it intercepts the laser beam at a specifically commanded steering angle of the laser beam steering device, each laser beam position detector being configured to determine the location of the interception in at least one dimension; and means for estimating states of thermal and vibrational deformation modes for the structure based upon the determinations by the laser beam position detectors.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
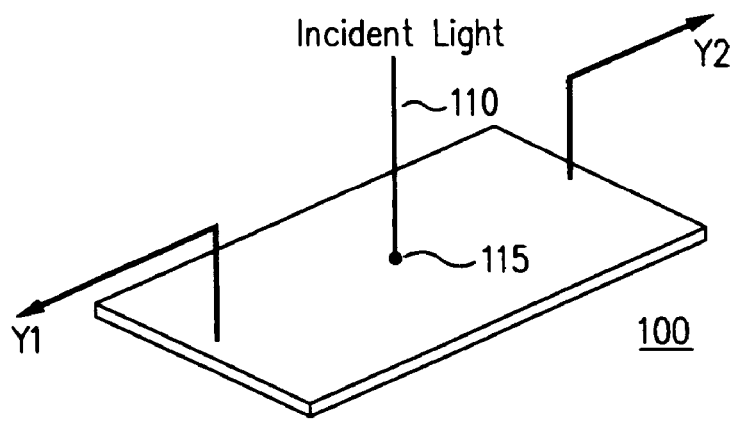
FIG. 1a is a perspective view of a conventional position sensing device that is an implementation of one-dimensional laser beam position detector (LBPD).
Figure 1B:
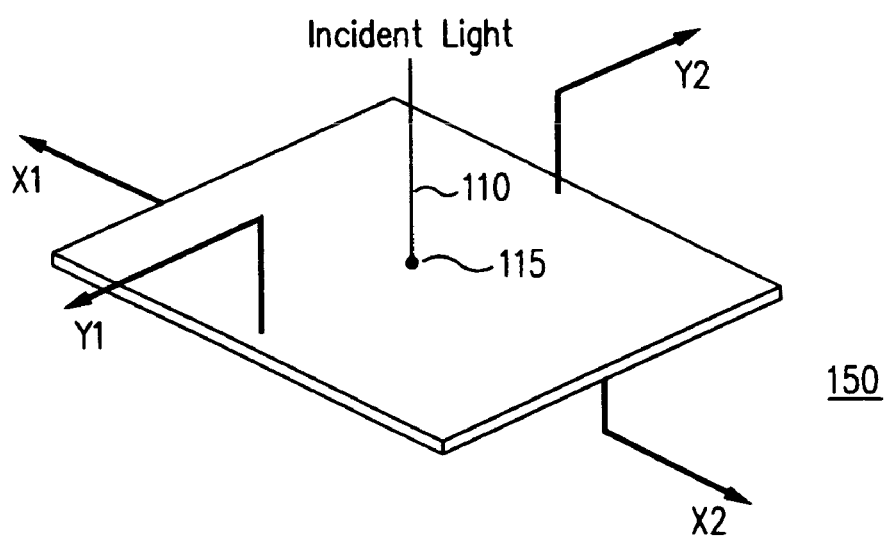
FIG. 1b is a perspective view of a conventional position sensing device that is an implementation of a two-dimensional laser beam position detector (LBPD).

To avoid the problems in the prior art previously described, the present invention uses a type of laser sensor that measures displacement of a laser beam interception point with the sensor in directions transverse to the propagation direction of the laser beam. As used herein, sensors that measure the transverse displacement of a laser beam interception point shall be denoted as "laser beam position detectors" (LBPDs). The transverse displacement of the laser beam interception point may be measured in just one dimension or in two dimensions. LBPDs configured for sensing the one-dimensional or two-dimensional displacements of a laser intersection point are known in the art and manufactured, for example, by UDT Sensors, Inc. One type of LBPD, known as a position sensitive detector (PSD) acts as a voltage divider. The voltages measured at the two ends of the PSD depend on the distance of each end to the intersection point 115. These two voltage measurements are used to generate the position measurement of the laser beam on the PSD. Turning now to FIG. 1a, a one-dimensional PSD 100 is illustrated. PSD 100 lies in the x-y plane. A laser source (not illustrated) projects a laser beam 110 normally to the surface of PSD 100 in the z direction such that it intersects PSD 100 at a point 115. As the position of PSD 100 changes due to surface deformation of the structure (not illustrated) to which it is mounted, intersection point 115 will change correspondingly. Because PSD 100 measures displacement in only one dimension with respect to an initial position for intersection point 115 (denoted as the y dimension in the figure), PSD 100 may only sense surface deformation with respect to positive or negative changes in the y direction. In contrast, a PSD 150 illustrated in FIG. 1b is configured to detect the displacement of intersection point 115 in 2 dimensions (denoted as the y and x dimensions, respectively) with respect to an initial position of PSD 150. Thus, as the position of PSD 150 changes due to surface deformation of the structure (not illustrated) to which it is mounted, PSD 150 may measure this deformation in either the x or y directions.

There are many other types of optical sensing devices that can be used as laser beam position detectors. These devices include quadrant photodetectors and diodes as well as focal plane and coupled charge device arrays. It will be appreciated that the metrology systems disclosed herein will work with any LBPD implementation.

Typically, the bandwidths of commercially-available PSDs are relatively high, e.g., 10 KHz to 3 MHz. Their resolution and accuracy generally depend upon their size in a ratio of approximately 1:1000. For example, a PSD having a length of ten millimeters may be configured to detect displacements in the range of 10 micro-meters. However, PSDs with substantially higher resolution-to-size ratios are known in the art. For example, PSDs having a resolution-to-size ratio on the order of 1:10,000,000 have been developed. Other LPPD devices such as focal plane arrays and coupled charge device arrays typically have much lower bandwidth but potentially higher accuracy such that they may be used to form LBPD systems with low bandwidth and high precision.

Figure 2A:
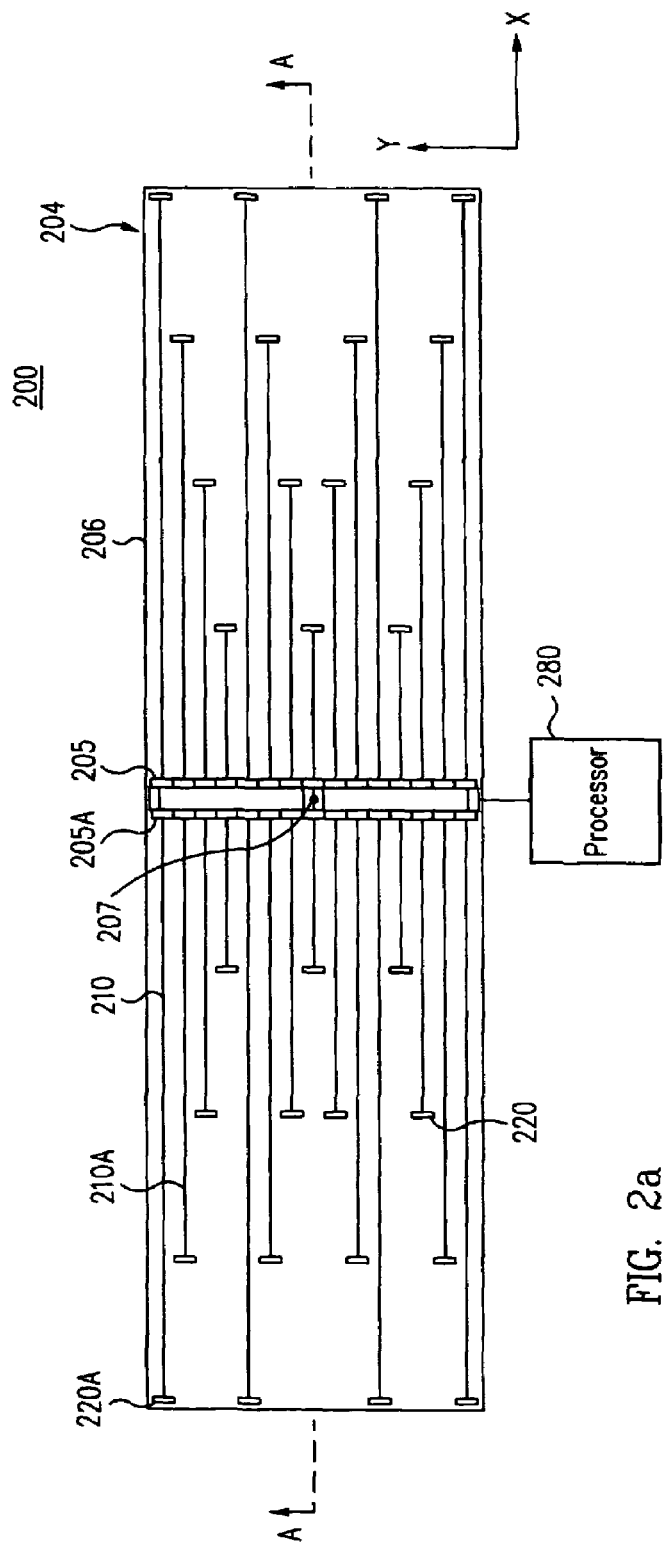
FIG. 2a is a plan view of a laser metrology system for characterizing the deformation of a planar structure according to one embodiment of the invention.
Figure 2B:
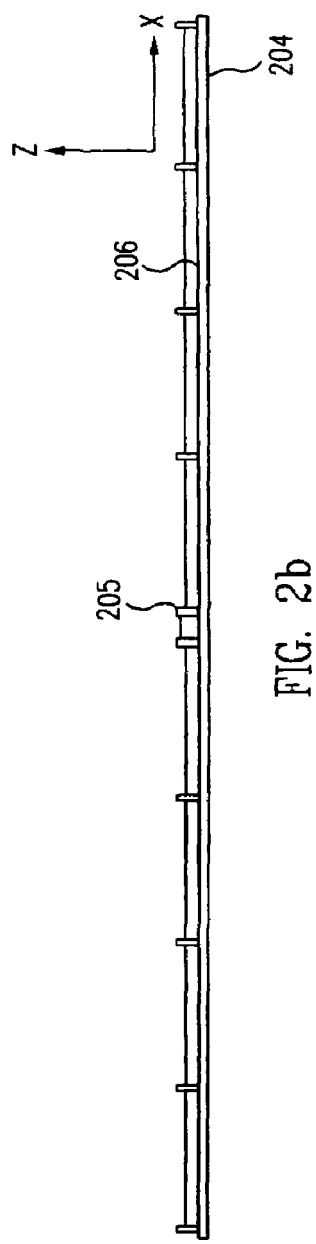
FIG. 2b is a cross-sectional view of the laser metrology system of FIG. 2a taken along line A-A.

An exemplary laser metrology system 200 configured to measure the deformation of a structural panel 204 having a planar surface 206 is shown in FIGS. 2a and 2b, wherein FIG. 2a illustrates a plan view and FIG. 2b illustrates a cross-sectional view. A plurality of laser sources 205 are located near a reference point of structural panel 204. For example, should structural panel 204 be intended for a spacecraft implementation, laser sources 205 may be arranged with respect to a central attachment point 207 of an inertial sensor (not illustrated). Planar surface 206 lies in the x,y plane. Laser sources 205 are configured to transmit their laser beams 210 transversely with respect to planar surface 206 but displaced from planar surface 206 by a certain z displacement as seen in FIG. 2b. A plurality of LBPDs 220 are arranged across planar surface 206 such that each LBPD 220 corresponds on a one-to-one basis with a laser source 205. For example, a laser source 205a projects its laser beam 210a to be intercepted by LBPD 220a. Each LBPD 220 is configured to measure either or both of the in-plane and out-of-plane deformation of planar surface 206 at the point where the LBPD 220 is attached to planar surface 206. As used herein, "out-of-plane" deformation will refer to deformation in a direction normal to the surface being measured (with respect to FIGS. 2a and 2b, the out-of-plane deformation would be z-directed). As also used herein, "in-plane" deformation will refer to deformation in a direction orthogonal to both the laser beam propagation direction and the out-of-plane deformation (with respect to FIGS. 2a and 2b, the in-plane deformation would be y-directed).

The distribution of LBPDs 220 across planar surface 206 should be such that a sufficient sampling of the in-plane and out-of-plane surface deformation may be made. From the surface deformation information provided by LBPDs 220, a state estimation may be made of the structural vibrational and thermal modes for structure 205. By then multiplying the estimated states for the modes with the mode shapes, the linear and angular deformation for any point along planar surface 206 may be estimated. The sampling of the surface deformation by LBPDs 220 is analogous to the Nyquist sampling theorem with respect to digitally sampling a signal—if a signal having a bandwidth of B is sampled at a rate of 2B, the entire signal may be reconstructed from the samples. Similarly, given a sufficient sampling of the deformation of planar surface 206, the entire surface deformation may be estimated. For a given surface, the distribution of LBPDs 220 sufficient to derive the entire surface deformation will be known to those of ordinary skill in the art. Furthermore, this distribution will depend upon whether one-dimensional or two-dimensional LBPDs 220 are implemented. In an array of two-dimensional LBPDs 220, each LBPD 220 may measure both the in-plane displacement and the out-of-plane displacement. However, should an array of one-dimensional LBPDs 220 be implemented, more LBPDs 220 would be required to derive the same amount of information as from a corresponding array of two-dimensional LBPDs in that, depending upon its orientation, a one-dimensional LBPD 220 can measure only one of the in-plane and out-of-plane deformations.

It will be appreciated that the one-to-one relationship between laser beam sources and laser beam position detectors discussed with respect to FIGS. 2a and 2b may be altered through the use of a laser beam steering device. For example, a laser beam source may be movably mounted, wherein the movement of the laser beam source is controlled by a MEMS actuator, rotary mirror, electro-optical device, fiber optic switch, or a beam spreader (e.g. diffractive optics, cylindrical lenses, etc). The steerable laser beam source could be positioned at central attachment point 207 and could then be steered so as to sequentially intersect each of the LBPDs at specific steering angles.

Figure 3A:
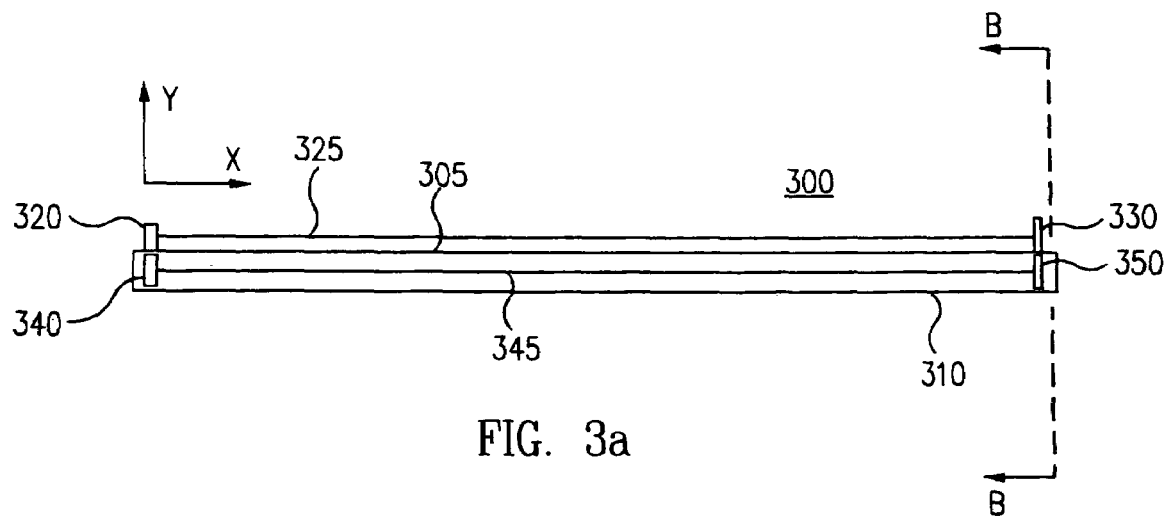
FIG. 3a is a plan view of a laser metrology system for characterizing the deformation of a structural boom in accordance with an embodiment of the invention.
Figure 3B:
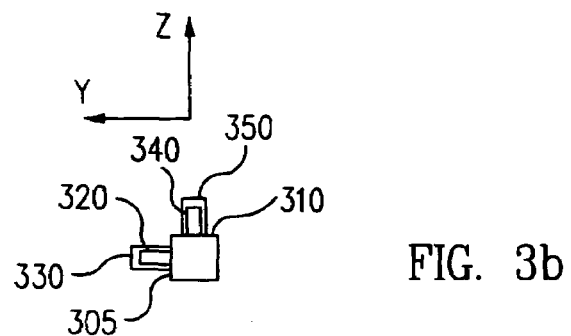
FIG. 3b is a cross-sectional view of the laser metrology system of FIG. 3a taken along line B-B.

The number and distribution of LBPDs 220 necessary to measure the deformation of a given structure will depend upon the geometry of the structure being measured. For a simple structure such as a rectangular boom 300 as illustrated in FIGS. 3a and 3b, just two two-dimensional LBPDs (or two one-dimensional LBPDs) and two corresponding laser sources would be sufficient to characterize z-directional and y-directional boom bending as well as x-axis boom twisting very accurately. Boom 300 extends longitudinally in the x direction and includes a surface 305 which faces the y direction and a surface 310 which faces the z direction. A laser source 320 adjacent one end of boom 300 provides a laser beam 325 which propagates in the x direction along surface 305. A laser source 340 provides a laser beam 345 which propagates in the x direction along surface 310. Laser beam 325 should propagate in the x direction but be displaced from surface 305 in the y direction by an amount sufficient to allow a LBPD 330 adjacent an opposing end of boom 300 to intercept beam 325 and measure y and z displacements—should laser beam 325 be too close to surface 305, a relatively-small y-directed displacement of LBPD 330 would move the laser beam interception point off the active surface of LBPD 330, thereby preventing a measurement of the displacement. Thus laser beam 325 should be displaced from surface 305 by a sufficient margin to accommodate any expected y-directed displacement yet still have the laser beam interception point within the active area of LBPD 330. Similarly, laser beam 345 should be displaced in the z-direction from surface 310 by a sufficient amount such that a LBPD 350 which intercepts laser beam 345 may measure all expected z-directed displacements. It will be appreciated that a similar displacement of laser beams 210 from planar surface 206 would be required for the laser metrology system 200 discussed with respect to FIGS. 2a and 2b.

Figure 4:
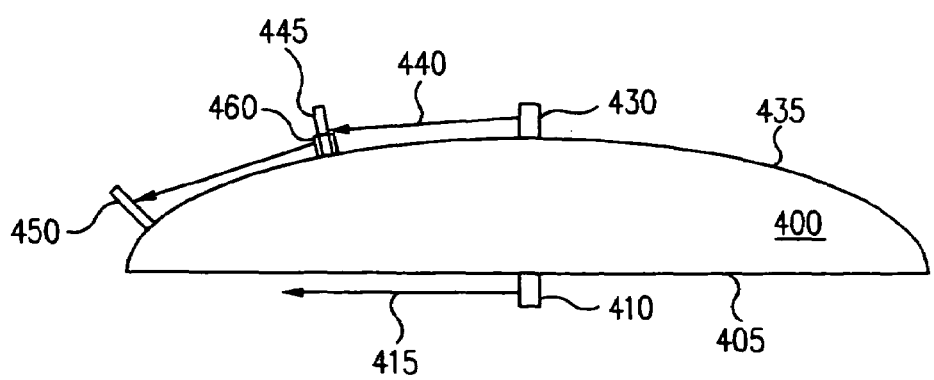
FIG. 4 is a cross-sectional view of a conformal structure having a laser metrology system in accordance with an embodiment of the present invention.

Non-planar or conformal structures are also accurately measured by the laser metrology technique disclosed herein. Because laser beams travel in straight lines, the distribution of laser sources across the surface of a non-planar structure must be such that the necessary distribution of LBPDs may all be illuminated by laser beams. For example, consider a non-planar structure 400 shown in cross-section in FIG. 4. Non-planar structure 400 includes a planar surface 405. A laser source 410 mounted on planar surface 405 may illuminate any LBPD on planar surface 405 that would be mounted in the direction of laser beam 415 emanating from laser source 410. However, consider a laser source 430 mounted centrally on the non-planar surface 435. Although laser source 430 could provide a laser beam 440 that would be intercepted by a LBPD 445 mounted relatively close to laser source 430, laser beam 440 could not be intercepted by a LBPD 450 mounted more remotely from laser source 430. Thus, an additional laser source or optical element (e.g. mirror) 460 may be used to illuminate LBPD 450. Note that the laser source 460 is co-located with LBPD 445. Thus, LBPD 450 measures the displacement of LBPD 450 with respect to LBPD 445 whereas LBPD 445 measures its displacement with respect to laser source 430. If a mirror is used collocated with LBPD 445 to extend a light source from source 430 along a curve instead of the laser source 460, the response at LBPD 450 will be different but characterize-able. Integrating these two measurements together will generate the displacement measurement for the structure point of LBPD 450 with respect to the structure point of laser source 430.

Figure 5:
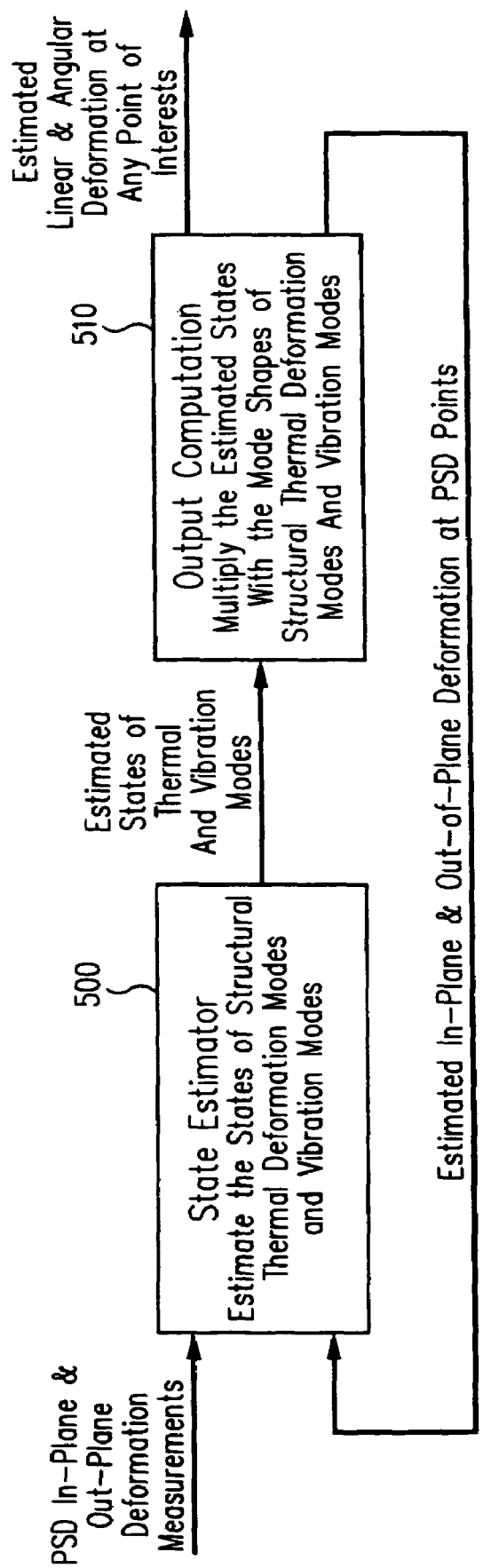
FIG. 5 illustrates a flowchart for the processing steps used to calculate a structure's deformation in accordance with an embodiment of the invention.

It will thus be appreciated that, given a sufficient distribution of LBPDs and laser sources, any surface may be measured by the laser metrology technique disclosed herein. Regardless of the surface being measured, this technique involves the use of a processor, such as processor 280 shown in FIG. 2a, that is configured to gather the in-plane and out-of-plane deformation information from the various LBPDs and process this information to calculate the structure deformation. The resulting processing may be summarized with respect to FIG. 5. A state estimator 500 receives the in-plane and out-of-plane deformation measurements from the LBPDs and provides estimated states of structural thermal and vibrational deformation modes to an output computation module 510. Module 510 is configured to multiply the estimated states with the mode shapes to provide the in-plane and out-of-plane deformation information that would be expected from the LBPDs for such estimations. These expected deformations may then be fed back to state estimator 500 so that the state estimations may be updated accordingly. For example, state estimator 500 may use a first order modal matrix A and a gain matrix G to provide the estimated states of the structural thermal and vibrational deformation modes at the LBPD locations as follows:

$$\hat{x}_{k+1} = A\hat{x}_k + G(y_k^m - \hat{y}_k)$$

where $\hat{x}_{k+1}$ represents the future estimated states, $\hat{x}_k$ represents the current estimated states, $\hat{y}_k$ represents the estimated in-plane and out-of-plane deformations at the measurements points determined by the locations of the LBPDs, and $y_k^m$ represents the measured in-plane and out-of-plane deformations at the measurements points determined by the locations of the LBPDs. The estimated in-plane and out-of-plane deformations at the measurement points is given by the following equation:

$$\hat{y}_k = C\hat{x}_k$$

where C is a mode shape matrix corresponding to the LBPD measurement points. Based upon these calculations, the linear and angular deformation at any arbitrary point of interest (represented by $\hat{z}_k$) on the structure being characterized is given by the following equation:

$$\hat{z}_k = H\hat{x}_k$$

where H is a mode shape matrix corresponding to these points of interests.

Note the advantages that flow from the above-described laser metrology system. The LBPDs are oriented to intercept laser light that is being transmitted in a parallel fashion to the structure surface. Thus, unlike prior art laser metrology system sensors that are oriented to receive approximately-normally-directed laser light, the LBPDs in the present laser metrology system are relatively insensitive to sunlight interference, assuming the surface being measured is oriented roughly orthogonally with respect to incoming sunlight. Moreover, even if the incoming sunlight is not so oriented, the laser metrology system may simply be shielded because the LBPD accepts a single laser beam over a small field-of-view. In addition, such a metrology system can be compactly packaged on the spacecraft, does not require any deployable supporting structure, and does not require significant amount of space to achieve needed accuracy. Given a laser metrology system as disclosed herein, a spacecraft incorporating an orientation-sensitive payload such as a phased-array antenna can measure the surface deformation and adjust the phase-feeding of the antenna accordingly such that the antenna beam direction is maintained very precisely. Moreover, surface control actuators may respond to the measured surface deformation so as to correct for and cancel this deformation.

Those of ordinary skill in the art will appreciate that many modifications may be made to the embodiments described herein. Accordingly, although the invention has been described with respect to particular embodiments, this description is only an example of the invention's application and should not be taken as a limitation. Consequently, the scope of the invention is set forth in the following claims.

We claim:

1. A laser metrology system for measuring deformation of a structure, comprising:
   a plurality of laser sources, each laser source configured to transmit a laser beam across a surface of the structure; and
   a plurality of laser beam position detectors distributed on the surface, each laser beam position detector being oriented such that it intercepts at least one of the laser beams, each laser beam position detector being configured to determine the location of the interception in at least one dimension.

2. The laser metrology system of claim 1, wherein each laser beam position detector is configured to determine the location of the interception in two dimensions.

3. The laser metrology system of claim 1, wherein the structure is a boom.

4. The laser metrology system of claim 1, wherein the surface is planar.

5. The laser metrology system of claim 1, wherein the surface is non-planar.

6. The laser metrology system of claim 1, wherein the structure is a spacecraft.

7. The laser metrology system of claim 6, wherein the spacecraft includes a phased-array antenna.

8. The laser metrology system of claim 1, further comprising:
   a processor configured to receive in-plane and out-of-plane deformation measurements from the plurality of laser beam position detectors, the processor being further configured to calculate the in-plane and out-of-plane deformation of any point on the structure's surface based upon the measurements from the plurality of laser beam position detectors.

9. The laser metrology system of claim 8, wherein the processor is configured to estimate the states of thermal deformation modes for the structure based upon the measurements from the plurality of laser beam position detectors.

10. The laser metrology system of claim 9, wherein the processor is configured to estimate the states of vibrational deformation modes for the structure based upon the measurements from the plurality of laser beam position detectors.

11. The laser metrology system of claim 10, wherein the processor is configured to estimate and predict in-plane and out-of-plane deformations for the laser beam position detectors based upon the estimated states of the thermal and vibrational modes.

12. The laser metrology system of claim 10, wherein the processor is configured to estimate the states of the thermal and vibrational modes based upon the difference between the estimated in-plane and out-of-plane deformations and the measured in-plane and out-of-plane deformations for the laser beam position detectors.

13. The laser metrology system of claim 12, further comprising:
   a plurality of surface actuators configured to adjust the structure's surface based upon the calculated in-plane and out-of-plane deformation of points on the structure's surface.

14. A method of measuring a structure's surface deformation, wherein the structure includes a plurality of laser beam position detectors distributed across its surface and a plurality of laser sources configured to transmit laser beams to the plurality of laser beam position detectors such that each laser beam position detector intercepts a laser beam, the method comprising:
   determining a default location of the laser beam interception point on each laser beam position detector for a non-deformed orientation of the structure;
   after a deformation of the structure, determining the change in position of the laser beam interception point for each laser beam position detector with respect to the default location; and
   processing the change in position for each laser beam interception point to determine the amount of deformation of the structure.

15. The method of claim 14, wherein the processing is such that the in-plane and out-of-plane deformation for the structure's surface is characterized.

16. The method of claim 15, wherein the determination of the change of position for each laser beam interception point comprises determining this change in one dimension.

17. The method of claim 15, wherein the determination of the change of position for each laser beam interception point comprises determining this change in two dimensions.

18. The method of claim 14, wherein the processing act comprises estimating states of thermal deformation modes for the structure.

19. The method of claim 14, wherein the processing act comprises estimating states of the vibrational deformation modes for the structure.

20. A laser metrology system for determining the deformation of a structure, comprising:
   a laser source configured to transmit a laser beam across a surface of the structure;
   a laser beam steering device configured to steer the laser beam from the laser source;
   a plurality of laser beam position detectors distributed on the surface, each laser beam position detector being oriented such that it intercepts the laser beam at a specific steering angle of the laser beam steering device, each laser beam position detector being configured to determine the location of the interception in at least one dimension; and
   means for estimating states of thermal and vibrational deformation modes for the structure based upon the determinations by the laser beam position detectors.

* * * * *